United States Patent
Hayashi

(10) Patent No.: US 8,812,639 B2
(45) Date of Patent: Aug. 19, 2014

(54) JOB MANAGING DEVICE, JOB MANAGING METHOD AND JOB MANAGING PROGRAM

(75) Inventor: Naoki Hayashi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 390 days.

(21) Appl. No.: 12/616,862

(22) Filed: Nov. 12, 2009

(65) Prior Publication Data

US 2010/0125847 A1    May 20, 2010

(30) Foreign Application Priority Data

Nov. 17, 2008 (JP) ................. 2008-293720

(51) Int. Cl.
*G06F 15/16* (2006.01)
*G06F 15/173* (2006.01)
*G06F 9/50* (2006.01)
*H04L 29/08* (2006.01)

(52) U.S. Cl.
CPC .............. *G06F 9/505* (2013.01); *G06F 9/5083* (2013.01); *H04L 67/1008* (2013.01)
USPC .......................................... 709/223; 709/205

(58) Field of Classification Search
CPC .... G06F 9/505; G06F 9/5083; H04L 67/1008
USPC ............... 709/205, 223, 224; 718/102
See application file for complete search history.

(56) References Cited

U.S. PATENT DOCUMENTS

| | | | |
|---|---|---|---|
| 5,889,989 A * | 3/1999 | Robertazzi et al. | 718/105 |
| 6,539,445 B1 * | 3/2003 | Krum | 710/110 |
| 6,640,239 B1 * | 10/2003 | Gidwani | 709/203 |
| 7,254,626 B1 * | 8/2007 | Kommula et al. | 709/223 |
| 2006/0044612 A1 * | 3/2006 | Kayama | 358/1.15 |
| 2009/0064166 A1 * | 3/2009 | Arimilli et al. | 718/105 |

FOREIGN PATENT DOCUMENTS

| | | |
|---|---|---|
| JP | 8-44678 A | 2/1996 |
| JP | 10-334057 A | 12/1998 |
| JP | 2000-151873 | 5/2000 |
| JP | 2001-503170 A | 3/2001 |
| JP | 2002-49603 A | 2/2002 |
| JP | 2004-94473 A | 3/2004 |
| JP | 2005-182641 | 7/2005 |
| JP | 2006-178663 A | 7/2006 |
| JP | 2007-257163 A | 10/2007 |

OTHER PUBLICATIONS

Japanese Office Action mailed Oct. 23, 2012 for corresponding Japanese Application No. 2008293720, Partial English-language Translation.

Japanese Office Action mailed Mar. 12, 2013 for corresponding Japanese Application No. 2008293720, with Partial English-language Translation.

* cited by examiner

*Primary Examiner* — Brian J Gillis
(74) *Attorney, Agent, or Firm* — Fujitsu Patent Center

(57) ABSTRACT

A job managing device distributes jobs to be processed to a plurality calculation devices. The job managing device includes an information obtaining unit that obtains at least one of characteristic information or load information of the plurality of calculation devices, a job size determining unit that determines a job size to be allocated to each of the plurality of calculation devices based on the information obtained by the information obtaining unit, a job dividing unit that divides a job to be processed into divided jobs based on the job sizes determined by the job size determining unit, and a job distributing unit that distributes the divided jobs to the plurality of calculation devices.

11 Claims, 17 Drawing Sheets

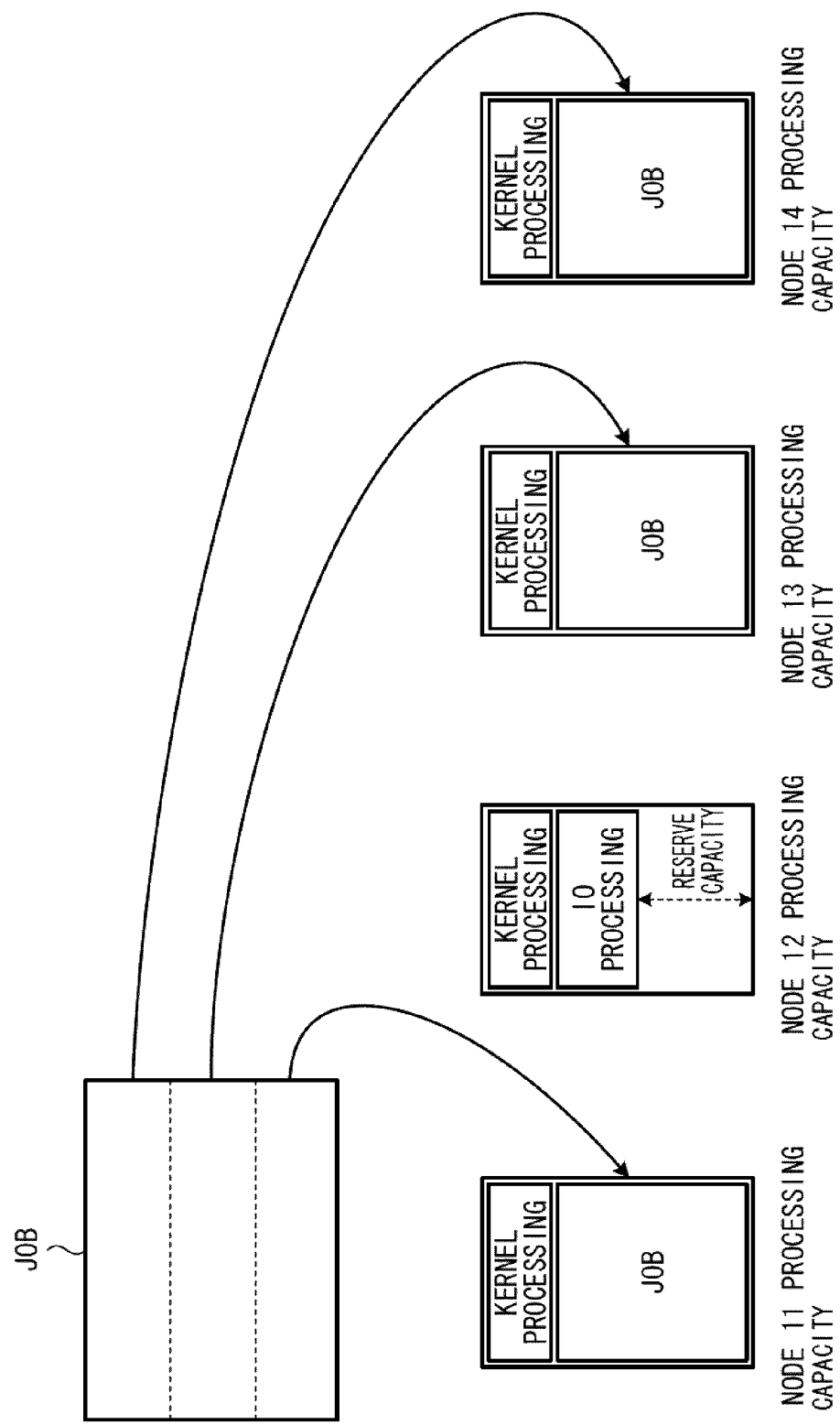

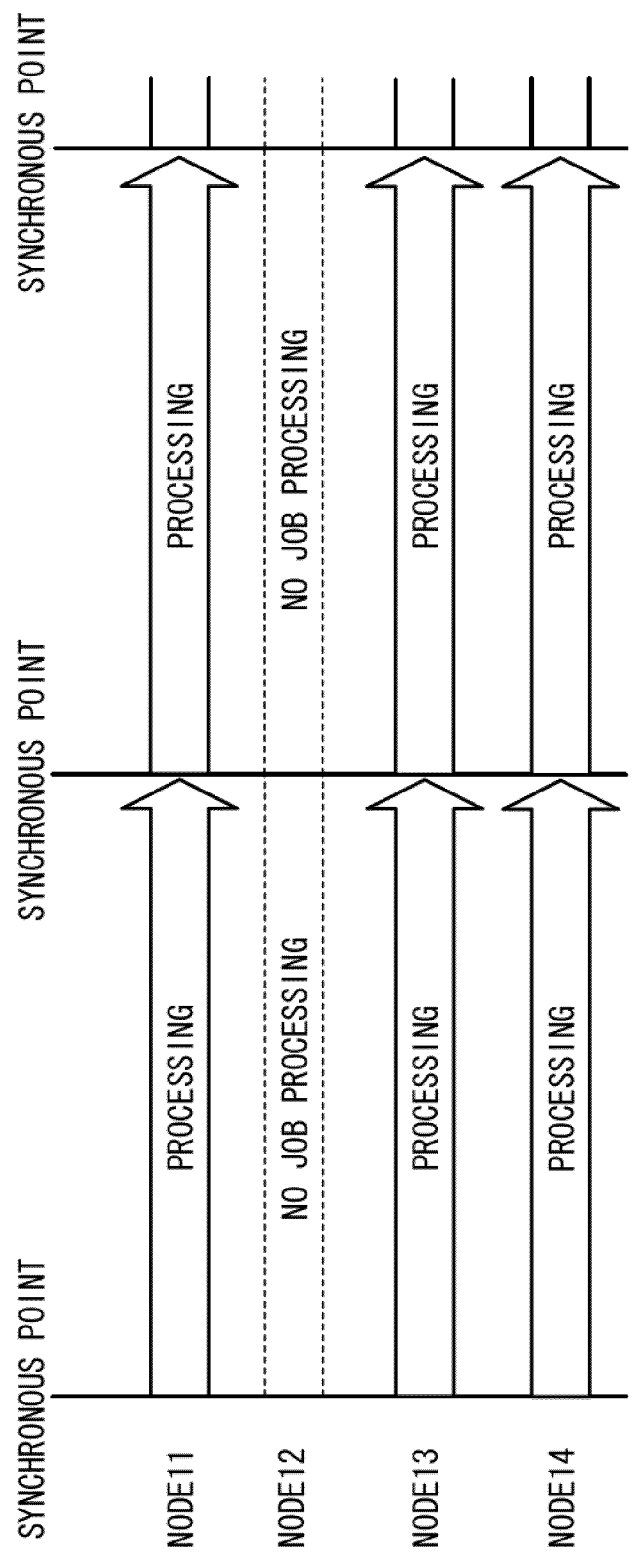

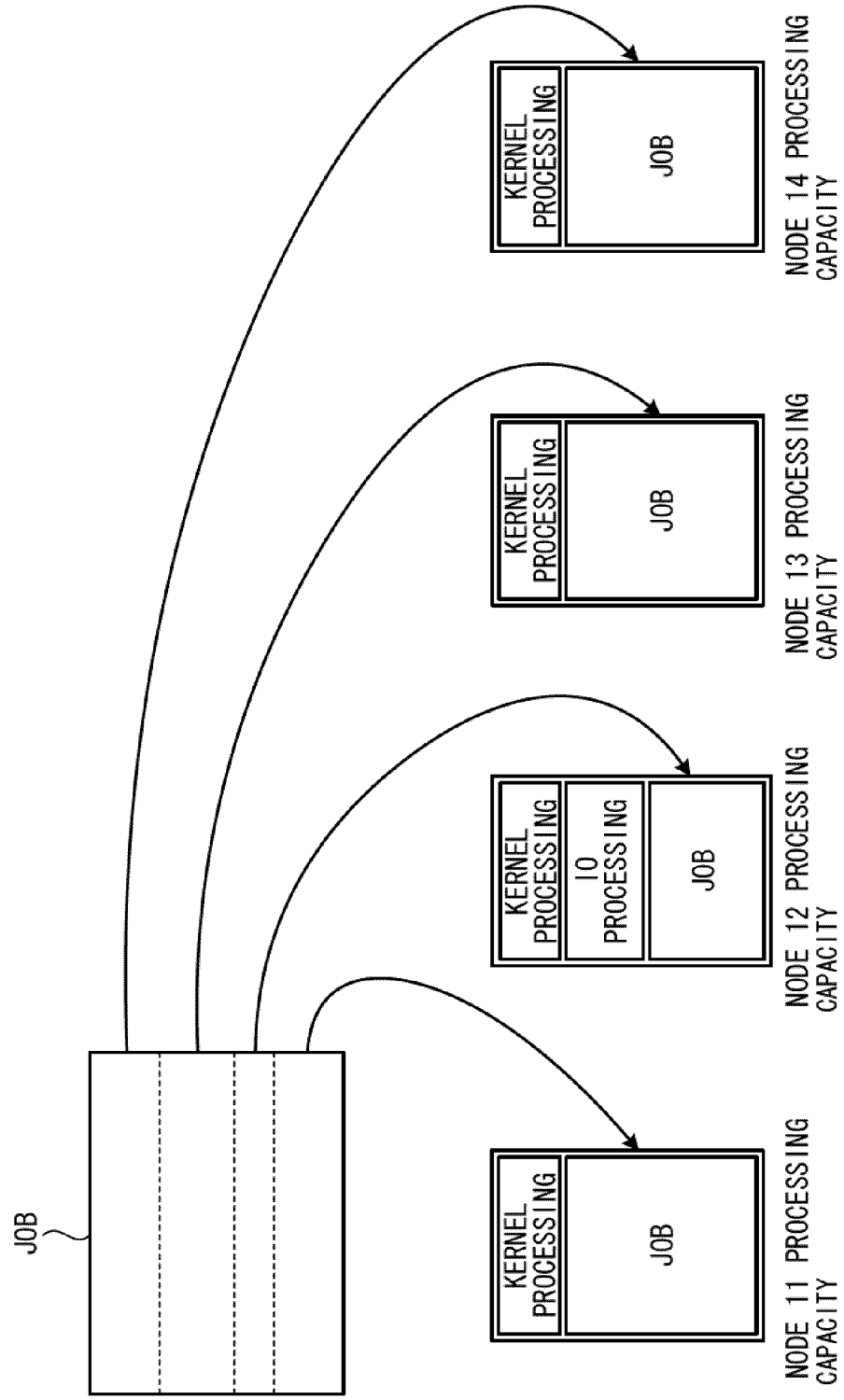

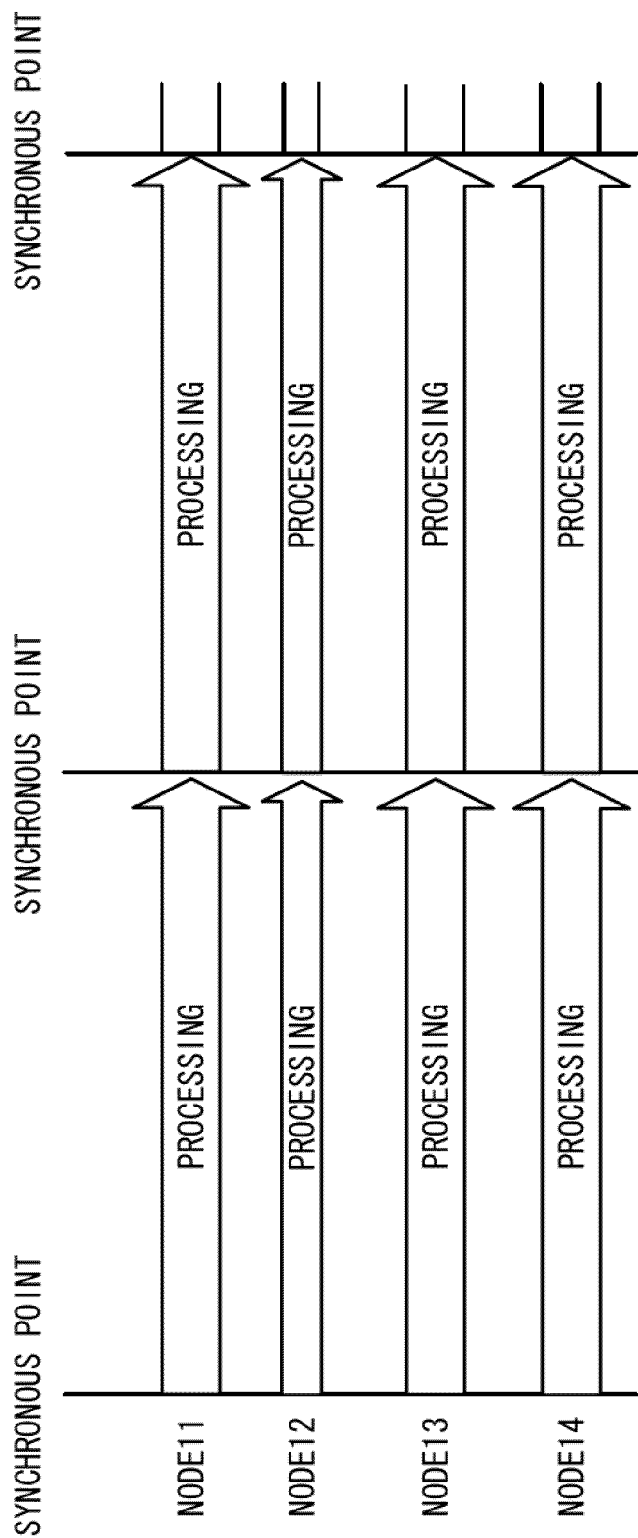

FIG. 9

| TERM | JOB SIZE DETERMINING MATERIALS | CONTENT |
|---|---|---|
| 1 | CALCULATION NODE TYPE | JOB SIZE IS DETERMINED ON THE BASIS OF CALCULATION NODE WITH IO, SIMPLE CALCULATION NODE, CPU TYPE, NUMBER, OPERATION FREQUENCY, MEMORY CONFIGURATION, ETC. (E.G.,) JOB SIZE IS SMALL FOR CALCULATION NODE WITH IO AND LARGE FOR SIMPLE CALCULATION NODE |
| 2 | CPU USAGE RATE | JOB SIZE IS DETERMINED ON THE BASIS OF CPU USAGE RATE. (E.G.,) JOB SIZE IS SMALL FOR HIGH USAGE RATE AND LARGE FOR LOW USAGE RATE |
| 3 | PRESENCE OR ABSENCE OF STAGING PROCESSING | JOB SIZE IS DETERMINED BASED ON WHETHER STAGING PROCESSING IS BEING EXECUTED OR NOT. (E.G.,) NO JOB IS DISTRIBUTED TO CALCULATION NODE UNDER STAGING PROCESSING (JOB SIZE OF 0) |
| 4 | IO USAGE RATE | JOB SIZE IS DETERMINED ON THE BASIS OF WHETHER HANDLING PROCESSING OF IO APPARATUS IS BEING EXECUTED OR NOT. (E.G.,) JOB SIZE IS SMALL FOR CALCULATION NODE HAVING HIGH IO PROCESSING RATE AND LARGE FOR CALCULATION NODE HAVING LOW IO PROCESSING RATE |
| 5 | SWAP OCCURRENCE RATE | JOB SIZE IS DETERMINED ON THE BASIS OF SWAP OCCURRENCE RATE. (E.G.,) JOB SIZE IS SMALL FOR CALCULATION NODE HAVING HIGH SWAP OCCURRENCE RATE AND LARGE FOR CALCULATION NODE HAVING LOW SWAP OCCURRENCE RATE |
| 6 | OPERATION RECORD | PROCESSING FLOW IS INVESTIGATED FROM PROFILE OF DEGREE OF IO PROCESSING AND CALCULATION DEGREE DURING OPERATION TO ESTIMATE PROPER JOB SIZE |
| 7 | JOB SCRIPT | DEGREE OF IO PROCESSING AND CALCULATION IS ESTIMATED FROM JOB SCRIPT (JOB OPERATION SCENARIO) TO DETERMINE JOB SIZE |

JOB MANAGING DEVICE, JOB MANAGING METHOD AND JOB MANAGING PROGRAM

CROSS-REFERENCE TO RELATED APPLICATION

This application is based upon and claims the benefit of priority of the prior Japanese Patent Application No. 2008-293720, filed on Nov. 17, 2008, the entire contents of which are incorporated herein by reference.

FIELD

Embodiments of the present invention discussed herein relate to a job managing device, a job managing method, and a job managing program that distribute jobs to a plurality of computing devices.

BACKGROUND

A technique in which processing is executed by a plurality of processing devices while the processing load is dispersed to the plurality of processing devices is known. For example, in a computing system in which a plurality of calculation devices are connected to each another, jobs are distributed to the respective calculation devices so as to be executed by the calculation devices, whereby the respective calculation devices are used as calculation nodes.

In most of computing systems having a plurality of nodes, the nodes contain calculation nodes each of which has Input/Output (I/O) capability (hereinafter referred to as an "I/O-capable calculation node"), and simple calculation nodes each of which has no I/O capability. The simple calculation node is a calculation node which has a Central Processing Unit (CPU) and a memory, and serves to execute calculation processing. However, the calculation node might have some I/O.

On the other hand, the I/O-capable calculation node is a calculation node which is equipped with not only a CPU and a memory, but also a storage device such as a HDD or the like and an input/output unit to be connected to a network. The I/O-capable calculation node also consumes its processing capacity for the I/O processing, and thus the pure calculation processing capacity to process a job in the I/O-capable calculation node is relatively lower than that in the simple calculation node having no I/O capability or a simple I/O capability.

Furthermore, when the type, the number, or the operation frequency of the CPU(s) mounted in the calculation node are different among the calculation nodes, there occurs a difference in calculation capacity among the calculation nodes.

The following are documents that describe multi-node processing systems.

[Patent document 1] JP-T-2001-503170
[Patent document 2] JP-A-2000-151873
[Patent document 3] JP-A-2005-182641

When jobs are equally distributed to calculation nodes which are different in job processing capacity as in the case of the I/O-capable calculation node and the simple calculation node, there is an advantage that the calculation resource is not needlessly wasted because the jobs are distributed to all the calculation nodes including the I/O-capable calculation nodes. However, time required for the job processing having the same processing quantity is longer in the I/O-capable calculation node than that in the simple calculation node, and thus a standby time occurs in the simple calculation node until the next processing is executed, so that there is a disadvantage that the time required to complete all the jobs is greatly increased.

On the other hand, when job allocation, or job distribution in other words, is not executed on the I/O-capable calculation nodes, but job allocation is executed on only the simple calculation nodes, there is an advantage that a processing delay which would be caused by a delay of synchronization does not occur because the simple calculation nodes are not required to wait for the completion of the processing by the I/O-capable calculation nodes. However, in this case, the hardware resource is wasted because the calculation processing capacities of the I/O-capable calculation nodes are not actively used.

According to the technique described above, when all the calculation nodes are used, the processing delay caused by waiting for synchronization occurs. However, when the waiting for synchronization is avoided, an empty calculation node exists and thus the hardware resource cannot be effectively used.

SUMMARY

According to an embodiment of the invention, a job managing device for distributing jobs to be processed to a plurality of calculation devices includes an information obtaining unit that obtains at least one of characteristic information or load information of the plurality of calculation devices, a job size determining unit that determines a job size to be allocated to each of the plurality of calculation devices based on the information obtained by the information obtaining unit, a job dividing unit that divides a job to be processed into divided jobs based on the job sizes determined by the job size determining unit, and a job distributing unit that distributes the divided jobs to the plurality of calculation devices.

BRIEF DESCRIPTION OF DRAWINGS

FIG. 5 illustrates a method of allocating jobs to only simple calculation nodes;

FIG. 6 illustrates a synchronous timing when the jobs are allocated to only the simple calculation nodes;

FIG. 7 illustrates a job division according to the embodiment;

FIG. 8 illustrates a synchronous timing in the job division according to the embodiment;

FIG. 9 illustrates factors to determine the processing capacity of a node;

DESCRIPTION OF EMBODIMENTS

A job managing device, a job managing method, and a job managing program according to an embodiment of the present invention will be described in detail with reference to the drawings.

Figure 1:
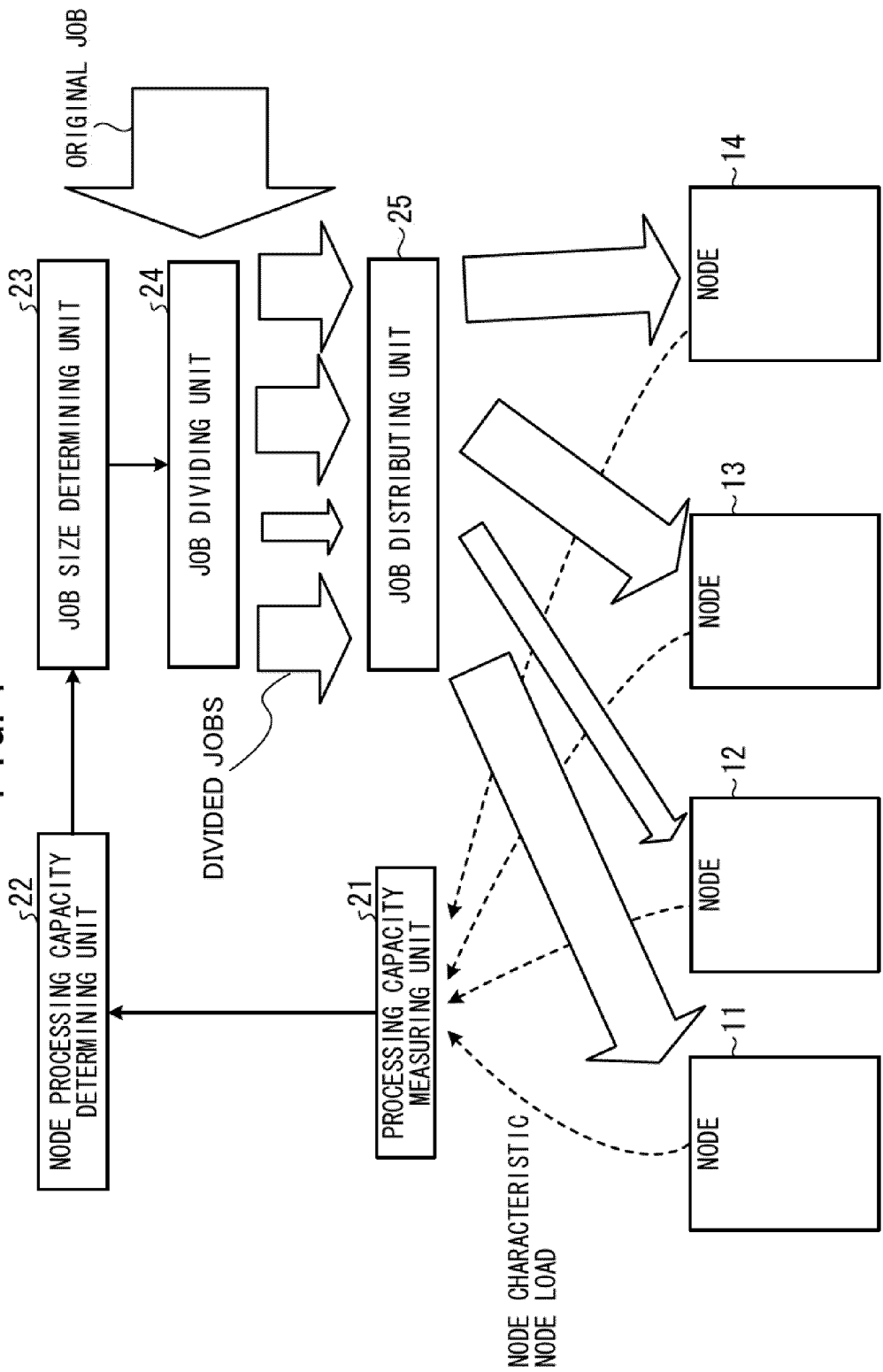
FIG. 1 illustrates a job managing method according to an embodiment of the invention.

FIG. 1 illustrates a job managing method according to an embodiment of the present invention. As illustrated in FIG. 1, in the job managing method according to the embodiment, a processing capacity measuring unit 21 measures various kinds of information such as node characteristics concerning the processing capacities, node loads, etc. of nodes 11 to 14. A node processing capacity determining unit 22 determines the processing capacities of the nodes 11 to 14. A job size determining unit 23 determines the sizes of jobs to be allocated to the respective nodes in accordance with the processing capacities of the nodes 11 to 14. A job dividing unit 24 divides a job (original job) up into smaller jobs (divided jobs) according to the determination result of the job size determining unit 23, and causes a job distributing unit 25 to distribute the divided jobs to the respective nodes.

According to the job managing method of the embodiment, jobs having appropriate sizes are distributed to the respective calculation nodes in conformity with the characteristics and load states of the calculation nodes.

In the example of FIG. 1, it is assumed that the processing capacity of the calculation node 12 is lower than the processing capacities of the other calculation nodes 11, 13, and 14. In the example of FIG. 1, one divided job which is smaller than the other divided jobs is distributed to the calculation node 12 having a lower processing capacity so that the calculation node 12 processes the smaller divided job. Furthermore, larger divided jobs are distributed to the calculation nodes 11, 13, and 14 having large processing capacities so that these calculation nodes process the larger divided jobs. With respect to the division of the original job, if the original job is 1000 steps for example, the original job is divided into a divided job of 350 steps, a divided job of 100 steps, a divided job of 300 steps, and a divided job of 250 steps. These divided jobs are distributed to the corresponding calculation nodes 11, 12, 13, 14, respectively.

The jobs whose sizes conform to the processing capacities of the calculation nodes are distributed to the respective calculation nodes, and the calculation nodes which are different in processing capacity finish the processing of the corresponding jobs substantially at the same timing. Therefore, occurrence of waiting for synchronous processing may be avoided.

Figure 2:
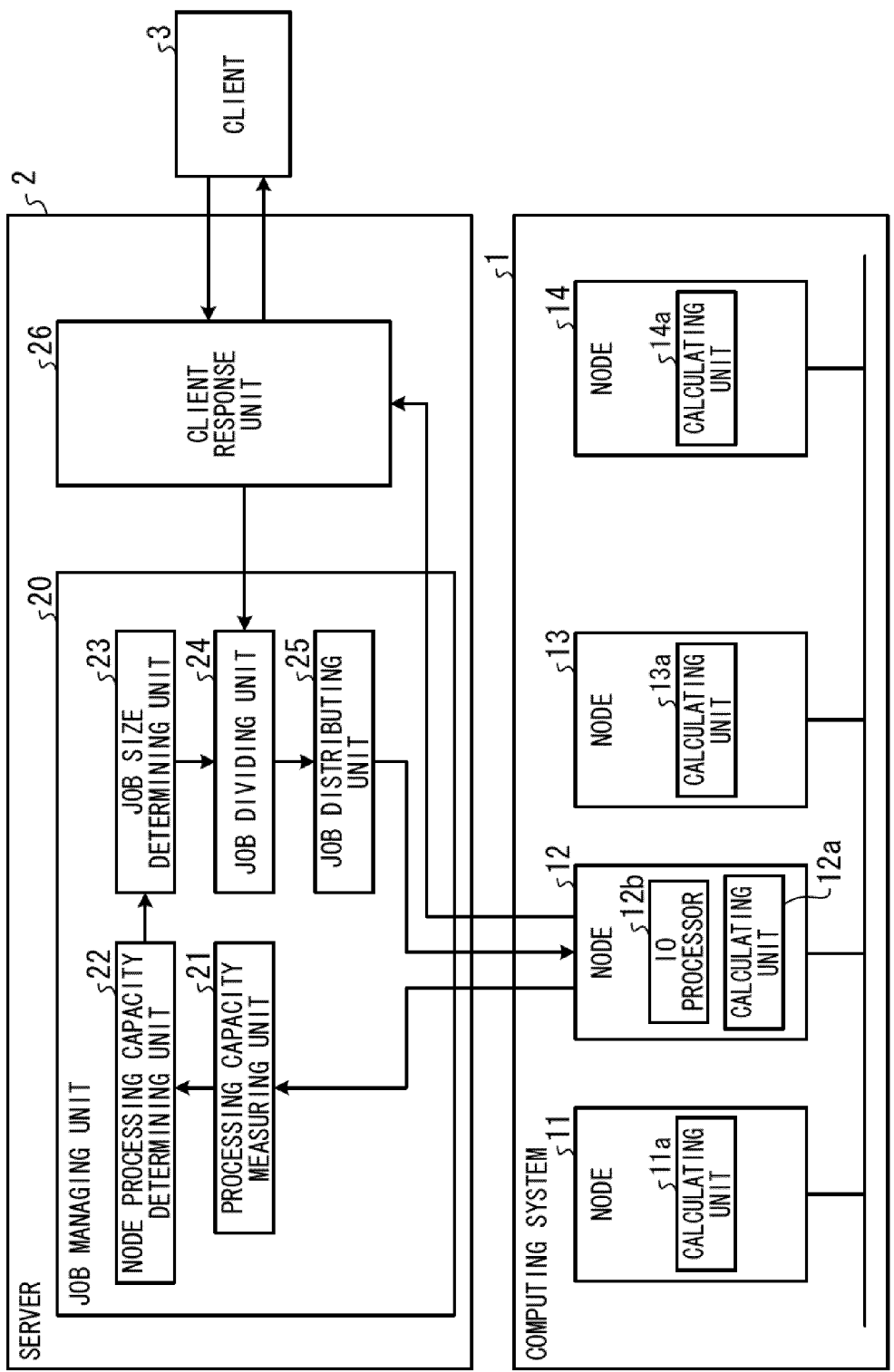
FIG. 2 illustrates a construction of a job processing system according to an embodiment.

FIG. 2 illustrates a configuration of the job processing system according to the embodiment. In the job processing system illustrated in FIG. 2, a server 2 is connected to a computing system 1 having a plurality of calculation nodes, and the server 2 is also connected to a client 3 through a network.

The nodes 11 to 14 included in the computing system 1 have calculating units 11a to 14a, respectively. Each calculating unit is a function unit implemented by a CPU and a memory, and processes a job which is distributed to a node having the calculating unit concerned.

Furthermore, the node 12 has an I/O processor 12b in addition to the calculating unit 12a. The I/O processor 12b is an interface for receiving and delivering a job from and to the server 2. The computing system 2 makes some nodes serve as I/O-capable calculation nodes for receiving and delivering data from and to the server and distributing jobs to the other nodes. The computing system 2 also makes the other nodes 11, 13, and 14 serve as simple calculation nodes for processing jobs.

The I/O processor 12b is a function unit implemented by CPU and a memory as in the case of the calculating unit. When the performance of CPU and the memory is similar among the respective nodes, the processing capacity of the calculating unit 12a of the node 12 is lower than those of the calculating unit 11a, 13a, and 14a of the other simple calculation nodes by the amount corresponding to the I/O processing.

The server 2 has a job managing unit 20 and a client response unit 26 therein. The client response unit 26 delivers a request from the client 3 as a job to the job managing unit 20, and receives a job processing result from the job managing unit 20 and then delivers the job processing result to the client.

The job managing unit 20 is a job managing device in this embodiment, and has therein a processing capacity measuring unit 21, a node processing capacity determining unit 22, a job size determining unit 23, a job dividing unit 24, and a job distributing unit 25.

The processing capacity measuring unit 21 functions as an information obtaining unit for obtaining characteristic information and load information of the nodes 11 to 14 from a performance analyzer or the like. The node processing capacity determining unit 22 determines the processing capacity of each node based on the information obtained by the processing capacity measuring unit 21. The job size determining unit 23 determines the size of a job to be allocated to each node based on the determination result of the node processing capacity determining unit 22.

The job dividing unit 24 divides the original job delivered from the client response unit 26 into smaller jobs (hereinafter referred to as "divided jobs") based on the allocation sizes determined by the job size determining unit 23. The job distributing unit 25 transmits the divided jobs divided by the job dividing unit 24 to the computing system while the divided jobs are associated with the nodes to which the jobs concerned are to be distributed.

In the computing system 1, the node 12 serving as the I/O-capable calculation node receives, from the server 2, a group of divided jobs, which are obtained by dividing up the original job, and whose distribution destinations (i.e., destination nodes) are specified, and then distributes the divided jobs to the respective nodes.

A job distributing method based on the job managing unit 20 of this embodiment and a job distributing method which is not based on this embodiment will be comparatively described with reference to FIGS. 3 to 8.

Figure 3:
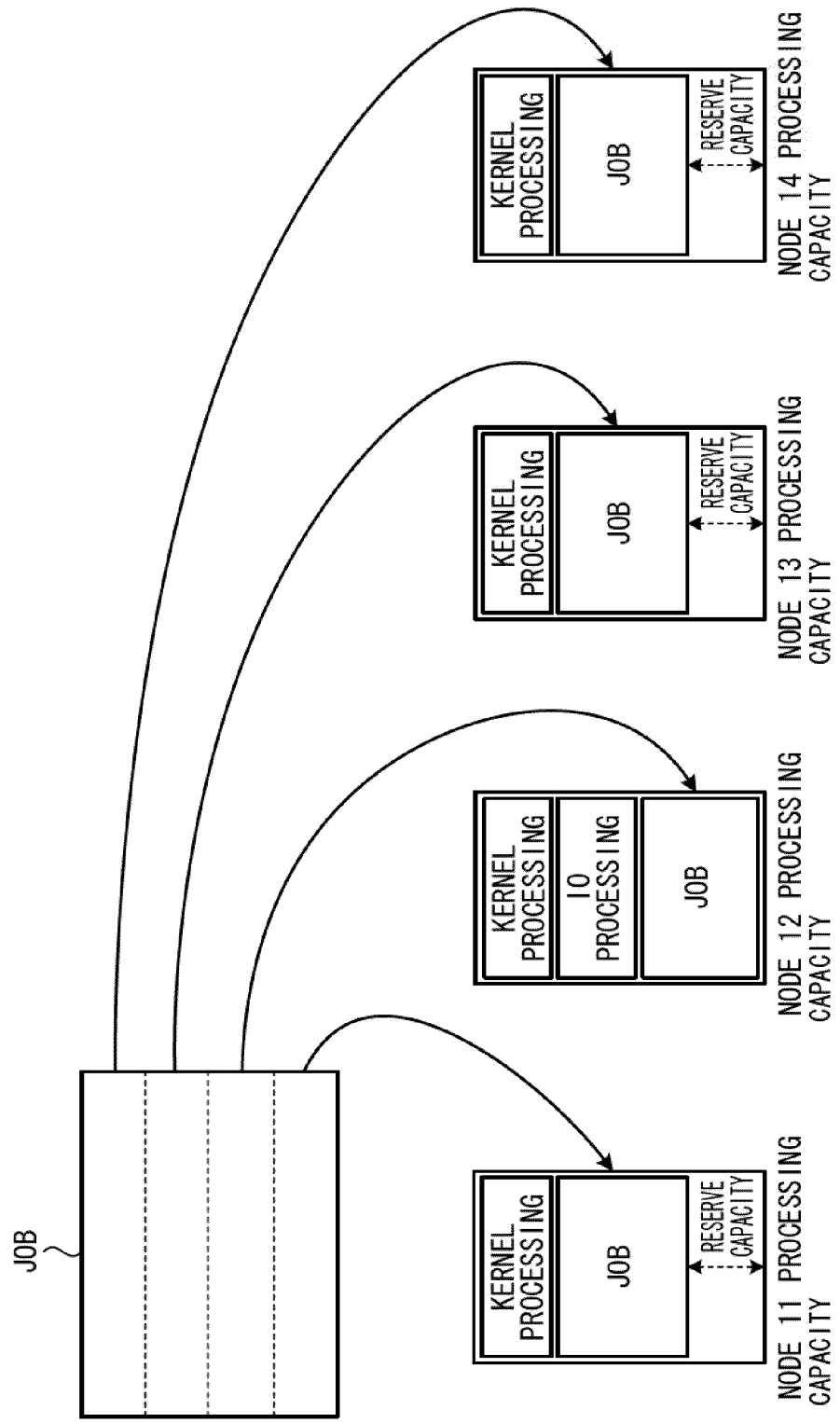
FIG. 3 illustrates a method of allocating jobs having the same size to all nodes.
Figure 4:
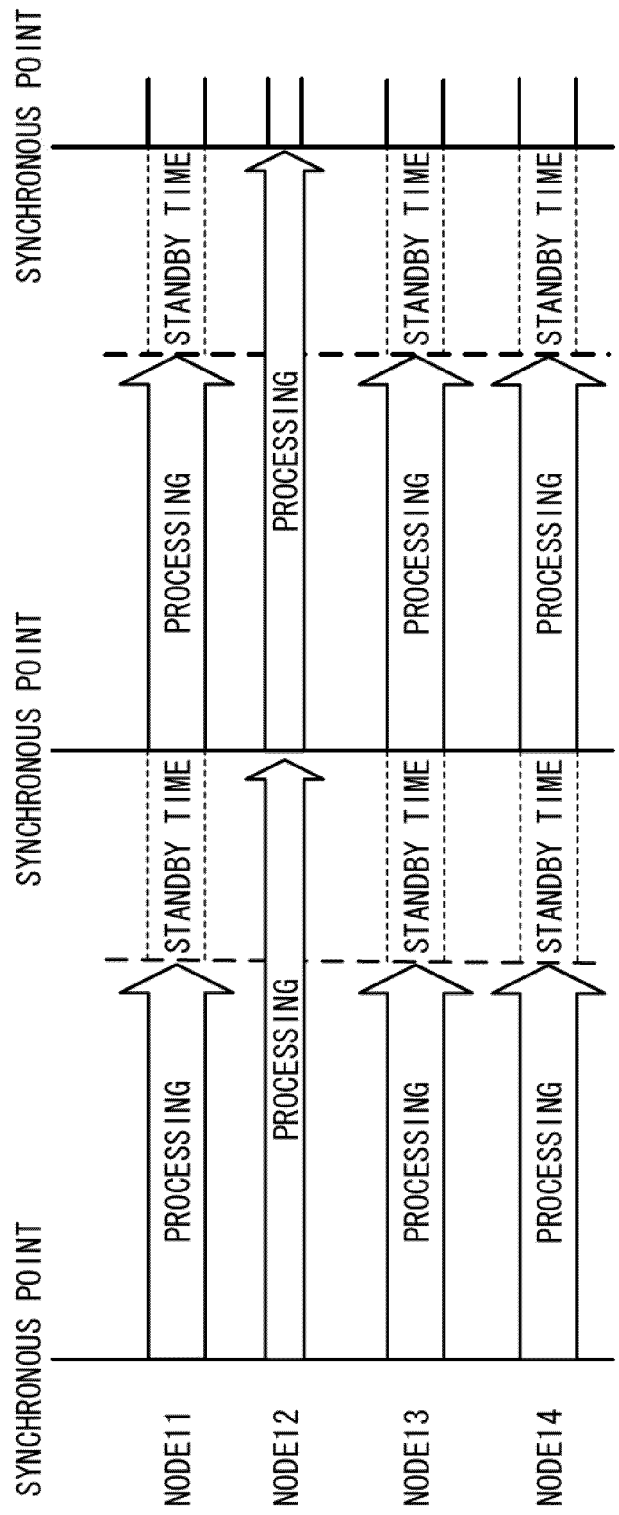
FIG. 4 illustrates a synchronous timing when the jobs having the same size are allocated to all the nodes.

FIG. 3 illustrates a method of allocating jobs having substantially the same size to all nodes. FIG. 4 is a diagram illustrating the synchronous timing in the method of allocating the jobs having substantially the same size to all the nodes.

In the example of FIG. 3, all the nodes have substantially the same processing capacity. However, the node 12 serving as the I/O-capable calculation node executes not only the kernel processing, but also the I/O processing and further executes a job by using the remaining processing capacity. On the other hand, the nodes 11, 13, and 14 serving as the simple calculation nodes may apply all the remainder of the kernel processing to the processing of the jobs. Due to the difference of these processing contents, reserve capacities would remain in the processing capacities of the nodes 11, 13, and 14 serving as the simple calculation nodes if the original job is divided into four equal divided jobs and the divided jobs are distributed to the nodes 11 to 14 as illustrated in FIG. 3.

Accordingly, when the processing is executed in each node, the nodes 11, 13, and 14 having the reserve capacities for the processing capacities finish their processing earlier than the node 12 serving as the I/O-capable calculation node. However, synchronization cannot be established among the nodes 11 to 14 unless the node 12 has finished the job distributed to itself. Therefore, the time period from the time at which the nodes 11, 13, and 14 that finish their processing earlier have completed their processing until the time when the node 12 has completed its processing corresponds to a standby time for the nodes 11, 13 and 14, and thus the nodes 11, 13, and 14 cannot actively use their processing capacities.

FIG. 5 is a diagram illustrating a method of allocating jobs to only the simple calculation nodes. FIG. 6 is a diagram illustrating a synchronous timing when the jobs are allocated to only the simple calculation nodes.

In the example of FIG. 5, all the nodes have substantially the same processing capacity. However, the node 12 serving as the I/O-capable calculation node executes not only the kernel processing, but also the I/O processing and further executes a job by using the remaining processing capacity. On the other hand, the nodes 11, 13, and 14 serving as the simple calculation nodes may apply all the remainder of the kernel processing to the processing of the jobs. Therefore, as illustrated in FIG. 5, the original job is divided into three jobs, and the thus-divided jobs are distributed to the nodes 11, 13, and 14 respectively. Accordingly, no reserve capacity remains in the processing capacities of the simple calculation nodes 11, 13, and 14, however, a reserve capacity remains in the I/O-capable calculation node 12.

Accordingly, when the processing is executed in each node as illustrated in FIG. 6, the processing of the jobs having the same size is executed by the nodes 11, 13, and 14 whose processing capacities are matched with one another, and thus the synchronous timing is matched among these nodes 11, 13, and 14, so that no standby time occurs. Accordingly, the simple calculation nodes 11, 13, and 14 may sufficiently exercise their processing capacities, however, the I/O-capable processing node 12 is not used for job processing even though it has a reserve capacity.

Contrarily to these techniques, according to the job distributing method based on the job managing unit 20, the size of the job to be allocated to each node is varied in accordance with the reserve capacity of the processing capacity of the node as illustrated in FIG. 7. Accordingly, a job having a smaller size is distributed to the node 12 serving as the I/O-capable calculation node as compared to the nodes 11, 13, and 14 serving as the simple calculation nodes, and thus little or no reserve capacity remains in any node.

Accordingly, when the processing is executed in each node as illustrated in FIG. 8, even nodes having different processing capacities may respectively execute the processing of jobs whose sizes are matched with the processing capacities thereof, so that the synchronous timing is matched among all the nodes and thus no standby time occurs. Therefore, the processing capacities of all the nodes may be effectively used and thus the original job may be processed at relatively high speed.

The processing capacity of the node to the job is varied in accordance with not only whether the node is an I/O-capable calculation node or not, but also other factors. However, particularly in the I/O-capable calculation node, the processing capacity which is applicable to the job processing is varied in accordance with the variation of the processing load of the I/O processing or the like. Furthermore, all the simple calculation nodes do not necessarily have the same configuration and performance.

Therefore, in the job managing unit 20, the processing capacity measuring unit 21 is made to obtain characteristic information and load information of every node, and the size of the job to be allocated is set on a node basis. FIG. 9 illustrates an example of conditions serving as materials to determine the sizes of jobs to be allocated to the nodes. As illustrated in FIG. 9, information such as the type of the calculation node, a CPU usage rate, the knowledge of the presence or absence of staging processing, an I/O usage rate, a memory swap occurrence rate, an operation record, and a job script is obtained for every node by the processing capacity measuring unit 21. The node processing capacity determining unit 22 synthesizes the information obtained by the processing capacity measuring unit 21 to thereby determine the processing capacity of each node.

The node processing capacity determining unit 22 determines the processing capacity of the node in consideration of a matter as to whether the type of the calculation node indicates the I/O-capable calculation node or the simple calculation node, the type, number, and operation frequency of CPUs mounted in the node, a memory configuration, etc. Based on the determination result as described above, the node processing capacity determining unit 22, for example, reduces the size of the job to be allocated to the I/O-capable calculation node and increases the size of the job to be allocated to the simple calculation node.

Furthermore, in consideration of the CPU usage rate of the calculation node, the node processing capacity determining unit 22 reduces the size of a job to be allocated to a node having a high CPU usage rate and increases the size of a job to be allocated to a node having a low CPU usage rate.

Still furthermore, the node processing capacity determining unit 22 does not distribute any job to a calculation node under staging in consideration of the presence or absence of data input/output processing in the I/O-capable calculation node, that is, the presence or absence of the staging processing.

In consideration of the occurrence rate of the handling processing of I/O equipment in the I/O-capable calculation node, the node processing capacity determining unit 22 reduces the size of a job to be allocated to a calculation node having a high I/O processing rate and increases the size of a job to be allocated to a calculation node having a low I/O processing rate.

In consideration of the occurrence rate of the memory swap in which another storage device such as a HDD (Hard Disk Drive) or the like is used as a virtual memory when the capacity of a memory for work is lacking, the node processing capacity determining unit 22 reduces the size of a job to be allocated to a calculation node having a high memory swap occurrence rate and increases the size of a job allocated to a calculation node having a low memory swap occurrence rate.

Furthermore, the node processing capacity determining unit 22 holds the record of the load state obtained from each node as profile information, and estimates the variation of the load of the node by analyzing the transition of the load state, thereby determining the size of the job to be allocated to the node. For example, when a high load state occurs periodically or when the load state varies in accordance with time, the load of the node is estimated from the period or the time and the job size is determined. In place of this method, the processing capacity of the calculation node may be estimated by determining the general outline of the processing based on a moving average from the profile information of the I/O processing and the node processing operation of the present algorithm. For example, processing information of about the past 20 minutes is subjected to weighted moving average at an interval of one minute so that the weight is larger as the information is nearer the average, thereby estimating the load of each node.

The node processing capacity determining unit 22 refers to the job script representing the operation schedule of the job and estimates the transition of the load of the node, thereby determining the size of the job to be allocated to the node.

Figure 10:
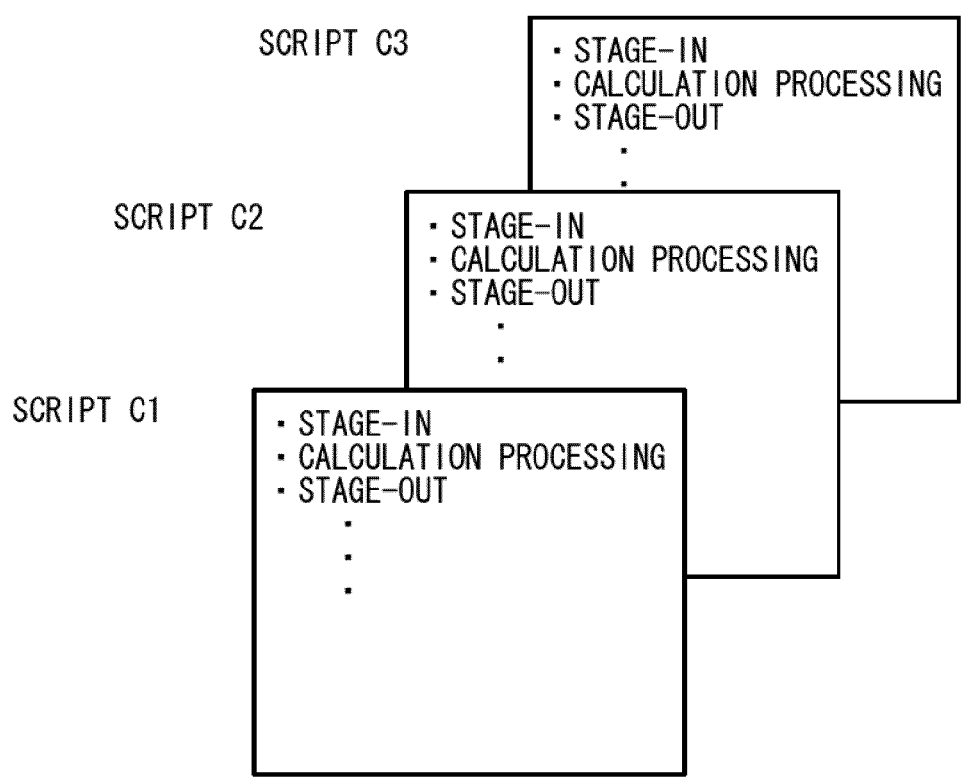
FIG. 10 illustrates examples of job scripts.

FIG. 10 is a diagram illustrating an example of the job script. In the example of FIG. 10, three example scripts C1 to C3 are illustrated. In each script is described the procedure of the processing, that is, stage-in for taking out data of a processing target, actual calculation, and stage-out for writing out a calculation result.

The node processing capacity determining unit 22 may analyze the script to automatically find out the plan of the I/O processing such as stage-in, stage-out, etc., determine a degree of congestion of I/O processing from the processing size of the I/O processing and hardware performance, and determine the size of the job to be distributed to the node.

Figure 11:
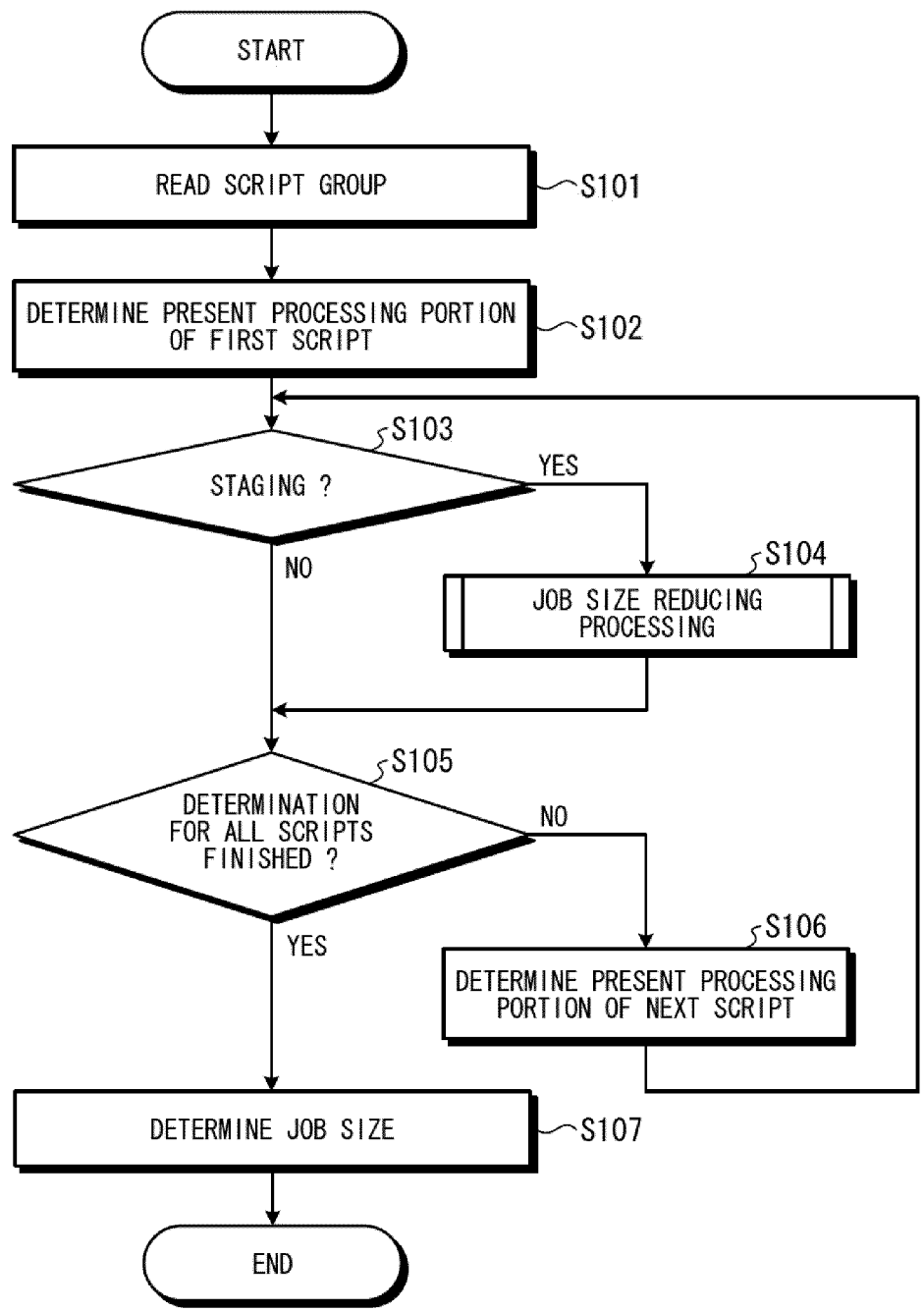
FIG. 11 is a flowchart illustrating the processing operation of analysis processing of a script.

FIG. 11 is a flowchart illustrating the processing operation of the script analyzing processing. As illustrated in FIG. 11, the node processing capacity determining unit 22 first reads a script group (S101), and determines the present processing portion with respect to the first script of the script group (S102). When the determination result indicates that staging exists at the present processing portion (S103, Yes), job size reducing processing (S104) is executed.

After the job size reducing processing in S104 is executed or when no staging exists at the present processing portion (S103, No), the node processing capacity determining unit 22 checks whether the determination on all the scripts has been finished or not (S105).

When a script remains on which the determination has not been executed (S105, No), the node processing capacity determining unit 22 determines the present processing portion of the next script (S106), and shifts the processing to S103. On the other hand, when the determination on all the scripts has been finished (step S105, Yes), the node processing capacity determining unit 22 determines the sizes of the jobs to be allocated to the nodes (S107), and then finishes the processing.

Figure 12:
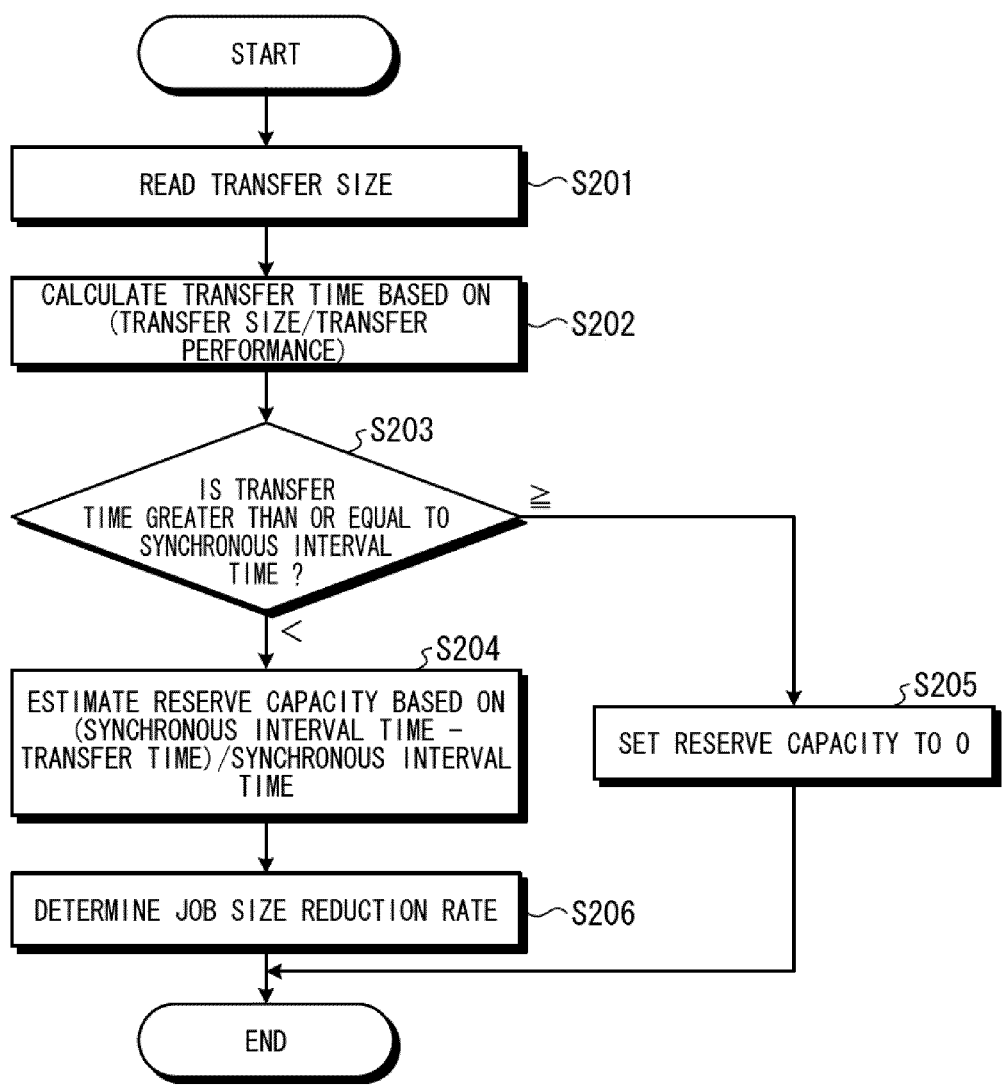
FIG. 12 is a flowchart illustrating job size reducing processing.

FIG. 12 is a flowchart illustrating the job size reducing processing illustrated in FIG. 11. In the job size reducing processing, the node processing capacity determining unit 22 first reads as a transfer size of the size of data to be transferred in staging (S201), and divides the transfer size by transfer performance to calculate a transfer time (S202).

When the calculated transfer time is greater than or equal to a synchronous interval (S203, Yes), the node concerned finishes the processing capacity for only the transfer processing, and has no reserve capacity to process the job until the next synchronous timing. Therefore, the reserve capacity of the node concerned is set to zero and the processing is finished (S205).

On the other hand, when the calculated transfer time is less than the synchronous interval (S203, No), the difference between the synchronous interval time and the transfer time is divided by the synchronous interval time to calculate the reserve capacity of the node (S204), the reduction rate of the job size is determined in accordance with the calculated reserve capacity (S206), and then the processing is finished.

The determination of the job size by the job size determining unit 23 will be described. When the size of a job to be distributed to a node is determined in accordance with whether the node is an I/O-capable calculation node or a simple calculation node, the job size coefficient of the simple calculation node is set to 1, the job size coefficient of the I/O-capable calculation node is set to a value $\alpha$ smaller than 1, the size of the original job is set to N, and a reference job size is calculated so as to satisfy the following expression:

$N$=(reference job size×number of simple calculation nodes+$\alpha$×reference job size×number of I/O-capable calculation nodes).

Furthermore, when the job size is optimized to each node, the number of nodes is set to m, the job size coefficients of the respective nodes are set to $\alpha 1, \ldots, \alpha m$, and the reference job size is calculated so as to satisfy the following expression:

$N=\alpha 1$×reference job size+$\alpha 2$×reference job size,$\ldots$, +$\alpha m$×reference job size.

The job size coefficient $\alpha n$ (where "n" represents an integer from 1 to m) may be calculated by integrating respective job size determining factors as in the following expression, for example.

$\alpha n$=(1-CPU usage rate)×(1−I/O usage rate)×(staging determination value)×(swap determining value)× (reduction rate based on job script)× . . . .

The respective factors described with reference to FIG. 9 may be used as the job size determining factors. In this expression, it is assumed that 0≤CPU usage rate≤1, 0≤I/O usage rate≤1. The staging determination value is set to 0 when staging occurs in the node, and set to 1 when no staging occurs. That is, with respect to nodes in which staging occurs, the job size "0" is allocated to the nodes with staging irrespective of the values of the other factors.

As in the case of the staging determination value, the swap determination value is set to 0 when swap occurs and set to 1 when no swap occurs. In this case, a job size coefficient calculation expression of giving any one value of "0" and "1" in accordance with the presence or absence of swap is used. However, if an occurrence probability concerning swap is obtained as illustrated in FIG. 9, it may be used as "1-swap occurrence rate" for the calculation of the job size.

All the terms used for the calculation of $\alpha n$ described above are not necessarily required to be used. Any one of the terms may be used, or any selected number of terms may be combined and used. For example, when only a CPU is used, the job size coefficient is calculated by using $\alpha n$=(1-CPU usage rate). Furthermore, when the I/O usage rate and the CPU usage rate are used, the job size coefficient is calculated by using $\alpha n$=(1-CPU usage rate)×(1−I/O usage rate). In this case, the job size coefficients $\alpha 1$ to $\alpha m$ when the job size is varied every node are calculated. However, the job size coefficient $\alpha$ when the job size coefficient of the simple calculation node is set to 1 and the job size coefficient of the I/O-capable calculation node is set to $\alpha$ may be calculated by using the same calculation expression.

As described above, the job size determining unit 23 uses, as the job size coefficient, the difference of the job processing capacity of the node output from the node processing capacity determining unit 22, and may calculate, or determine, how the whole job should be divided. Furthermore, the job size coefficient is set to 0 for nodes having no reserve capacity like the I/O-capable calculation node under staging, so that no job is allocated to the nodes with staging.

Figure 13:
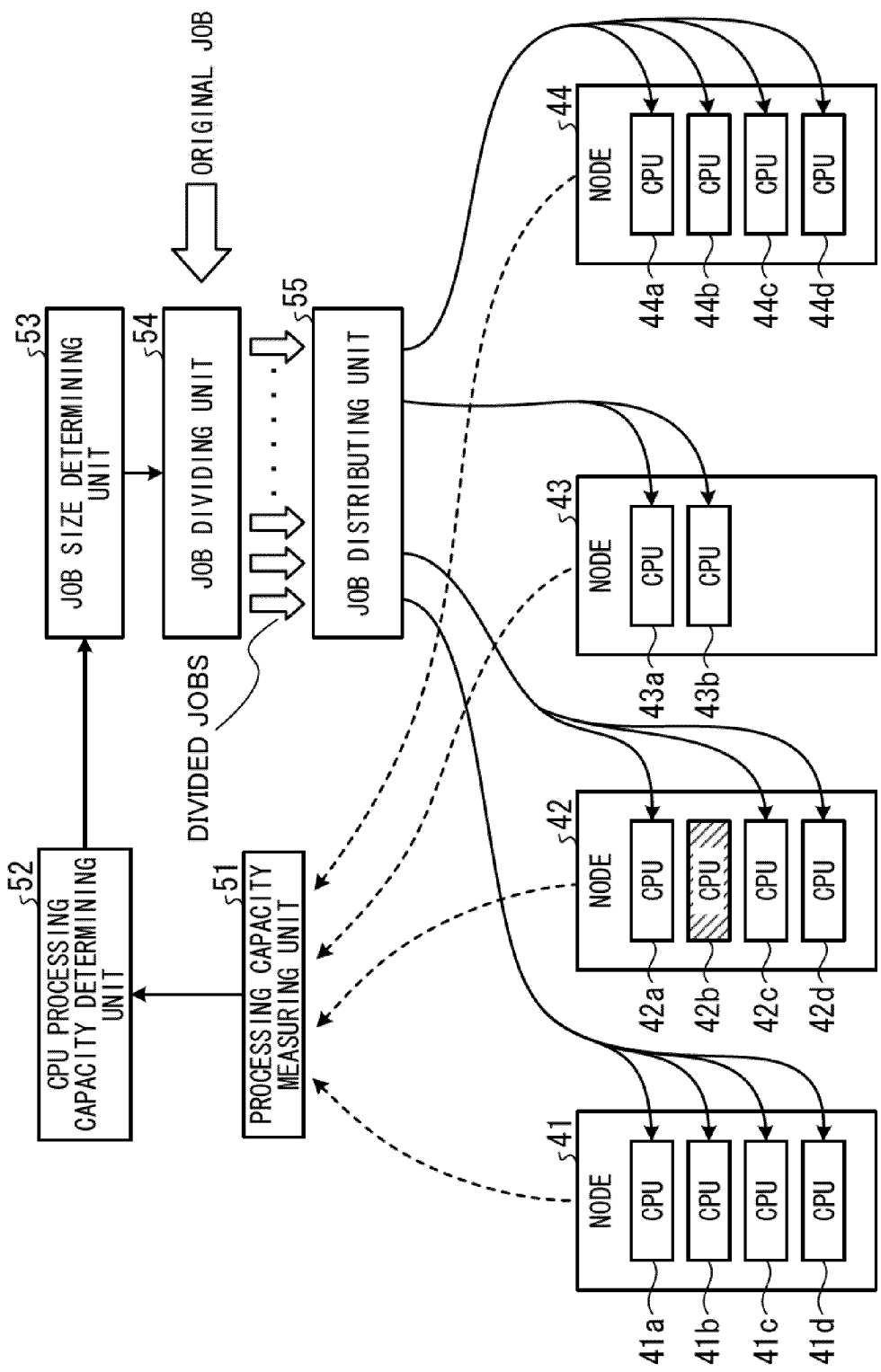
FIG. 13 illustrates a job distributing method when job distribution is executed on a CPU basis.

In the foregoing description, the job distribution is performed on a node basis. However, the job distribution may be performed on a CPU basis. FIG. 13 illustrates a job distributing method when the job distribution is performed on a CPU basis.

In the example of FIG. 13, a node 41 is a simple calculation node, and has four CPUs 41a, 41b, 41c, and 41d. A node 42 is an I/O-capable calculation node and has four CPUs 42a, 42b, 42c, and 42d. The node 42 uses CPU 42b for only input and/or output. A node 43 is a simple calculation node, and has two CPUs 43a and 43b. A node 44 is a simple calculation node and has four CPUs 44a, 44b, 44c, and 44d.

The processing capacity measuring unit 51 obtains, from each node, at least the number of CPUs mounted in the node and the use application of each CPU. The CPU processing capacity determining unit 52 determines the processing capacity of each CPU. The job size determining unit 53 determines the size of a job to be allocated to each CPU by using the determination result of the CPU processing capacity determining unit 52, and the job dividing unit 54 divides the job according to the above determination. Accordingly, the job distributing unit 55 distributes the divided jobs to the respective CPUs.

At this time, if the job distribution is not performed on CPU 42b used exclusively for I/O processing, an appropriate amount of jobs may be distributed to each node.

Particularly when it may be presumed that other conditions such as the performance of the CPU, etc. are the same, the job management may be easily performed by equally dividing and distributing jobs to CPUs based on the number and use applications of CPUs.

For example, in the construction of FIG. 13, if jobs having the same size are distributed to CPUs other than CPU 42b, the jobs are consequently distributed to the nodes 41 to 44 in the ratio of 4:3:2:4.

Furthermore, when the performance of individual CPUs is different, the job size given based on the individual CPU characteristic, for example the frequency, may be varied. For example, a large job size is given to CPU having high processing performance while a small job size is given to CPU having low processing performance.

For example, in the construction of FIG. 13, if the processing capacities of CPUs 41b, 41c, and 44a are twice as large as the processing capacities of other CPUs, the job size given to CPU 41b, 41c, and 44a is set to be twice as large as the job size given to the other CPUs. As a result, jobs are distributed to the nodes 41 to 44 in the ratio of 6:3:2:5.

Next, a configuration where the job management of the I/O-capable calculation nodes and the job management of the simple calculation nodes are independently performed will be described with reference to FIG. 14.

Figure 14:
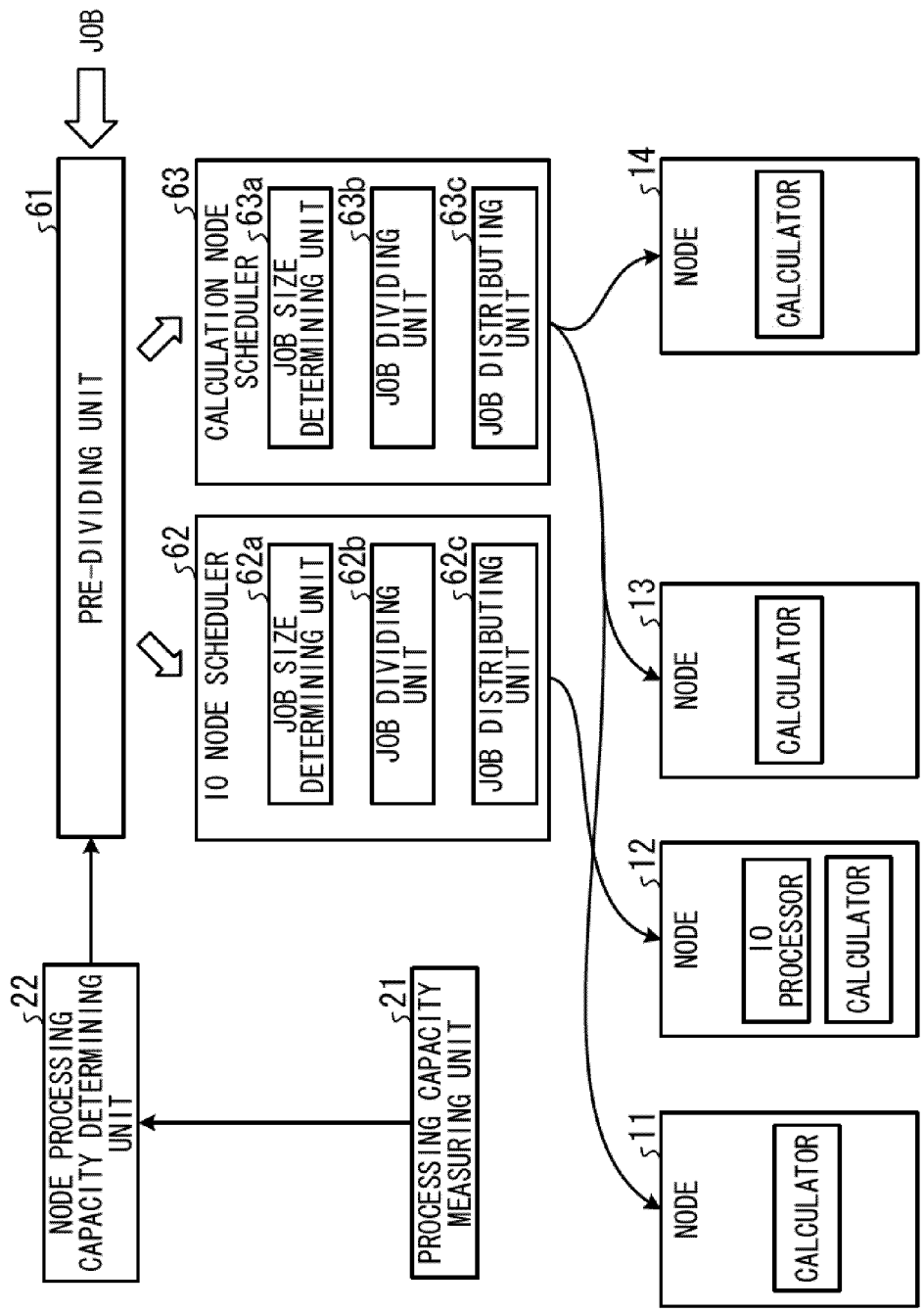
FIG. 14 illustrates an example of the construction in which a plurality of job schedulers are provided.

According to the job managing method illustrated in FIG. 14, the processing capacity measuring unit 21 obtains the information concerning the nodes 11 to 14, and the node processing capacity determining unit 22 determines the processing capacity of each node as in the case of FIG. 1. A pre-distributing unit 61 divides jobs into jobs to be distributed to the I/O-capable calculation nodes and jobs to be distributed to the simple calculation nodes, delivers the jobs to be distributed to the I/O-capable calculation nodes to an I/O node scheduler 62, and delivers the jobs to be distributed to the simple calculation nodes to a calculation node scheduler 63.

The I/O node scheduler 62 and the calculation node scheduler 63 have job size determining units 62a and 63a, job dividing units 62b and 63b, and job distributing units 62c and 63c respectively, and the I/O node scheduler 62 and the calculation node scheduler 63 each independently manage the jobs.

Accordingly, the I/O node scheduler 62 manages the job of the node 12 as the I/O-capable calculation node, and the calculation node scheduler 63 distributes and manages jobs to the nodes 11, 13, and 14 as the simple calculation nodes.

Figure 15:
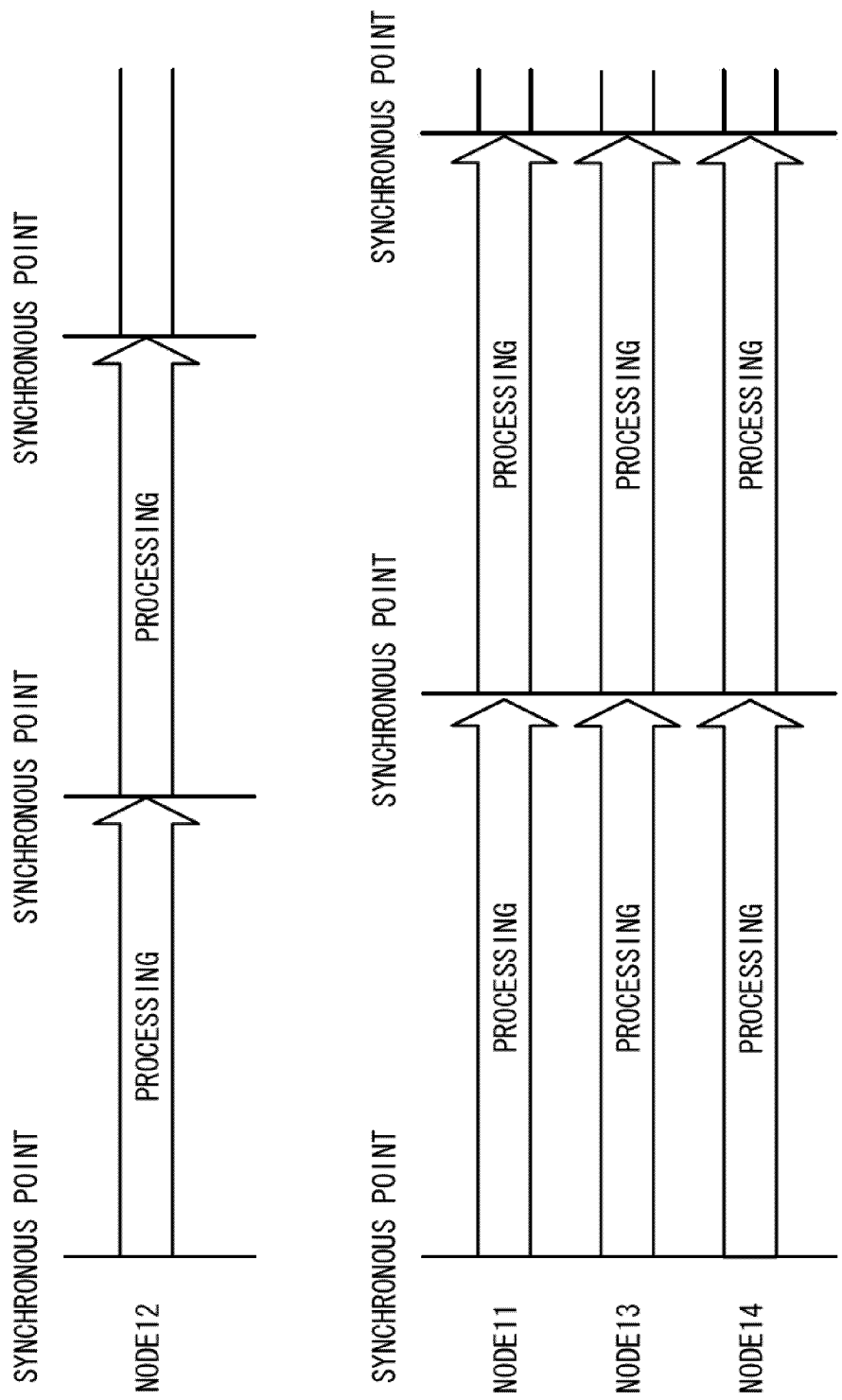
FIG. 15 illustrates a synchronous timing when the plurality of job schedulers are provided.

In the example of FIG. 14, the I/O node scheduler 62 and the calculation node scheduler 63 independently manage the respective jobs, and thus the synchronous point of the node 12 and the synchronous point of the nodes 11, 13, and 14 may be different from each other as illustrated in FIG. 15. Therefore, all the nodes execute the processing of the jobs, and also occurrence of the synchronous waiting may be avoided.

In the foregoing description, the job managing unit is provided in the server. However, the location of the job managing unit may be changed appropriately.

Figure 16:
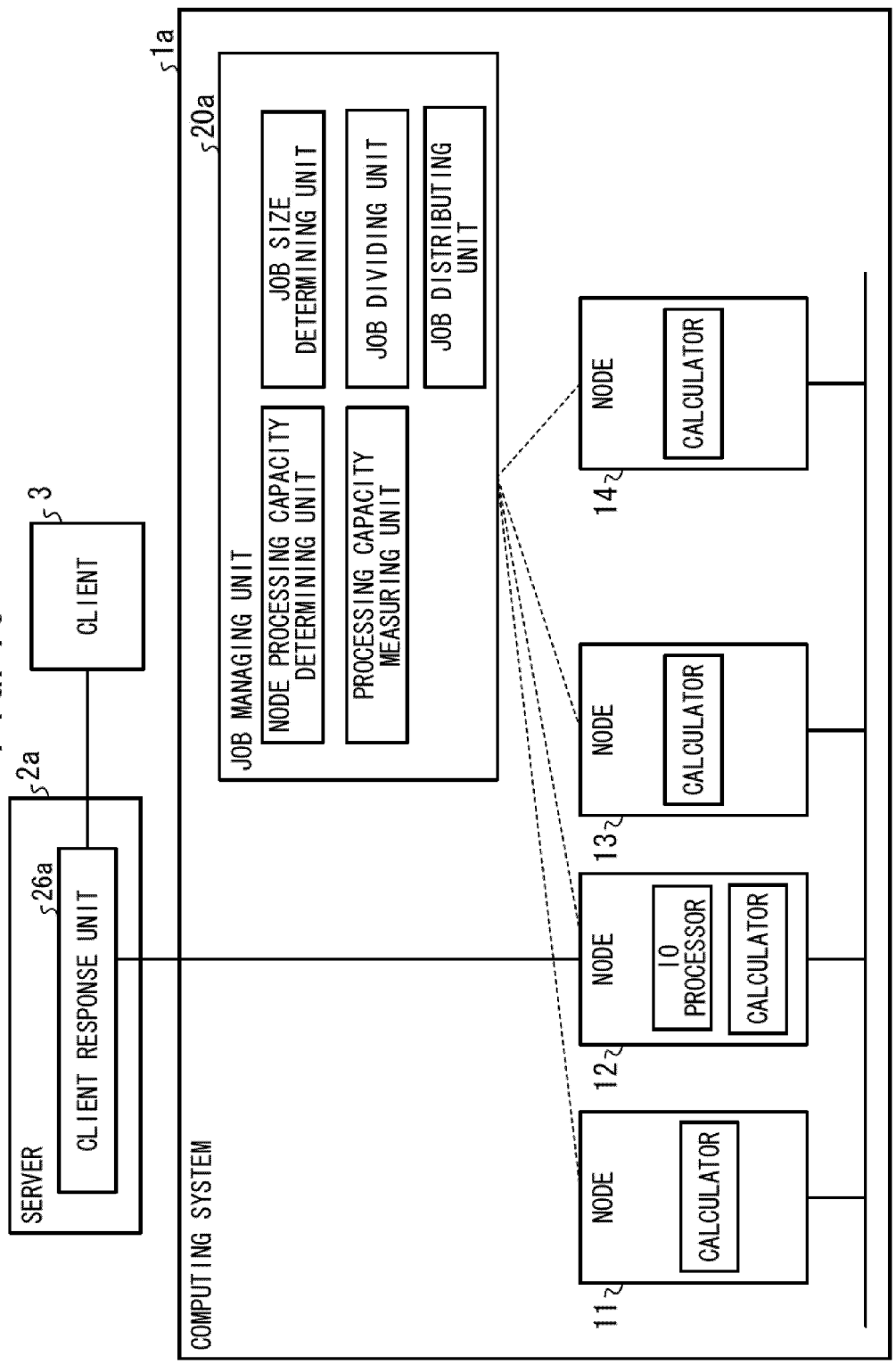
FIG. 16 illustrates an example of the construction when a job managing unit is provided at the computing system side.

FIG. 16 illustrates an example in which the job managing unit is provided on the computing system side. In the construction of FIG. 16, the client response unit 26a in the server 2a is directly connected to the node 12 of the computing system 1a.

In the computing system 16, the job managing unit 20a is provided independently of a passage through which jobs are transmitted and received. The job managing unit 20a directly obtains various kinds of information from the nodes 11 to 14, and also obtains the overall size of the job from the node 12 as the I/O-capable calculation node which receives the job from the server 2a. Thereafter, the job managing unit 20a calculates the sizes of the jobs to be distributed to the respective nodes, transmits the jobs to the node 12, and makes the node 12 distribute the jobs.

Figure 17:
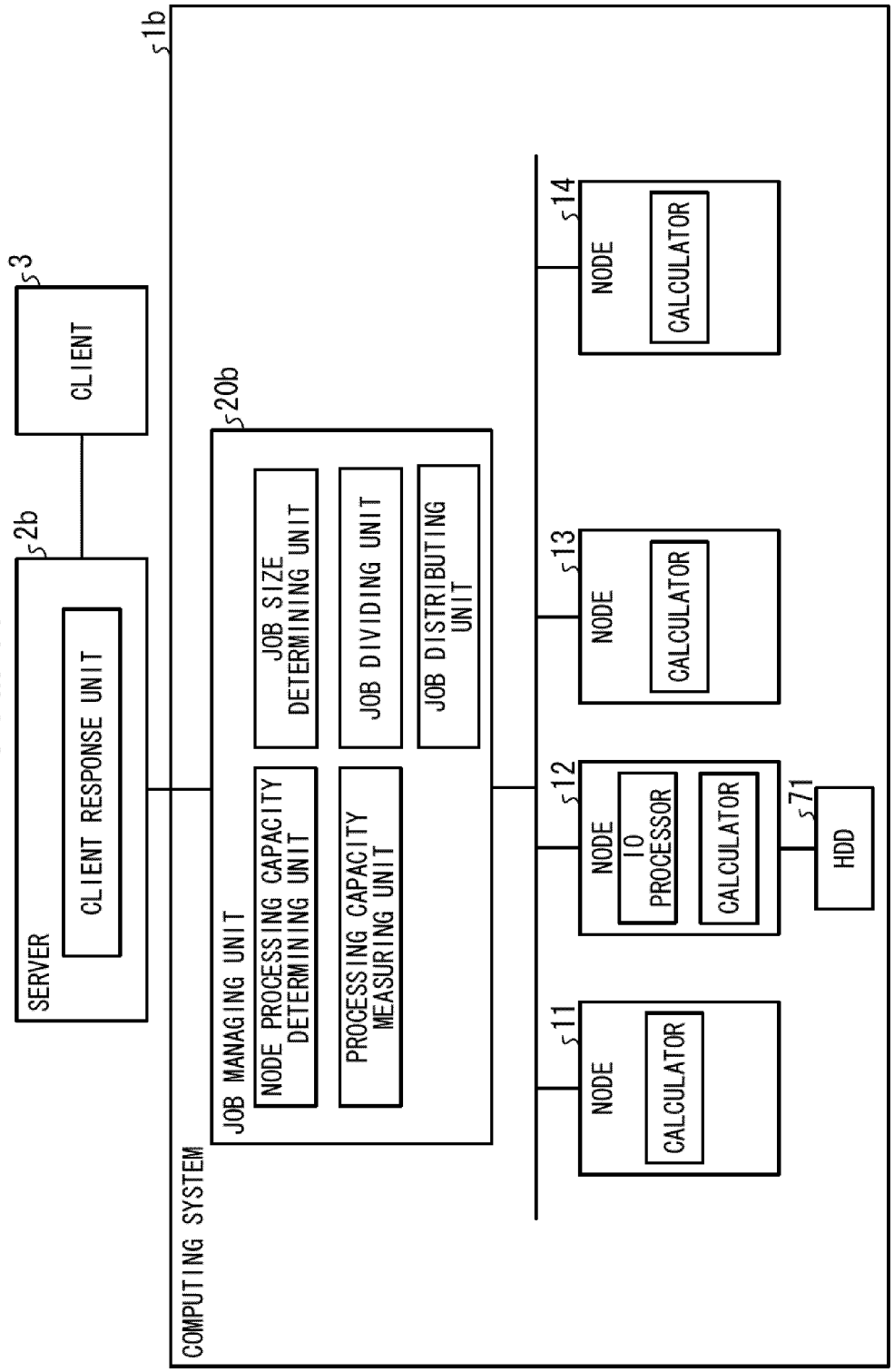
FIG. 17 illustrates an example of the construction when the job managing unit is provided at the computing system side.

FIG. 17 illustrates an example in which the job managing unit is provided to the computing system side. In the construction illustrated in FIG. 17, the server 2b is connected to the job managing unit 20b provided in the computing system 1b.

The job managing unit 20b obtains various kinds of information from the nodes 11 to 14 in the computing system 1b, and executes the determination of the sizes of jobs to be distributed to the respective nodes, the division of the original job, and the distribution of the divided jobs. In the computing system 1b, the node 12 is not connected to the server 2b, and the I/O processing of the node 12 is used for input and output for HDD 71 connected to the node 12.

As described above, in the job managing unit according to this embodiment, jobs having different sizes are allocated to nodes having different job processing capacities as in the case of the I/O-capable calculation node and the simple calculation node. Therefore, all the calculation node resources may be effectively used without being wasted. Furthermore, the job size is set so as to be appropriate for the calculation node or the CPU core, whereby the standby time of the synchronous waiting may be reduced and thus the throughput of the processing may be enhanced.

The embodiment is particularly effective for enhancement of the processing throughput of a large-scale computer having a multi-node construction like a super computer. Furthermore, a specific example of the job is suitable for the processing of an algorithm of a LU decomposition problem. The LU decomposition problem aims to shorten the calculation time by executing matrix calculation processing in parallel, and this is an example of fields in which the effect of this invention is remarkable.

The above embodiment is an example, and the configuration and operation of the above embodiment may be properly modified and executed. Particularly, if the respective constituent elements of the job managing unit of this embodiment are implemented by software, this embodiment may be implemented as a job managing program, and any computer device may be operated as a job managing device.

What is claimed is:

1. A job managing device for allocating jobs to be processed to a plurality of calculation devices, the job managing device comprising:

a first processor to execute a process including:
   obtaining configuration information indicating whether a calculation device is coupled to an input/output device and load information of the plurality of calculation devices;
   determining a job size to be allocated to each of the plurality of calculation devices based on the obtained configuration information and the obtained load information so as to reduce a reserve capacity of a processing capacity of each of the plurality of calculation devices;
   dividing a job to be processed into a plurality of divided jobs based on the determined job sizes; and
   allocating the plurality of divided jobs to the plurality of calculation devices.

2. The job managing device according to claim 1, wherein the plurality of calculation devices include a calculation device that is coupled to the input/output device and processes input/output processing with the coupled input/output device, and a calculation device that is not coupled to the input/output device, and
   the first processor determines a job size allocated to the calculation device that is coupled to the input/output device to be smaller than a job size allocated to the calculation device that is not coupled to the input/output device.

3. The job managing device according to claim 2, wherein each of the plurality of calculation devices is a portion of a computing system, and
   the calculation device coupled to the input/output device processes the input/output processing to a storage device as the input/output device in the computing system.

4. The job managing device according to claim 1, wherein the first processor further obtains at least one of a processor usage rate, knowledge of the presence or absence of staging processing, an input/output processing occurrence rate, or a memory swap occurrence rate in each of the plurality of calculation devices as characteristic information, and the first processor changes job sizes to be allocated to the plurality of calculation devices by using the obtained characteristic information.

5. The job managing device according to claim 4, wherein the calculation device includes a plurality of second processors and the first processor obtains the characteristic information and load information of the plurality of second processor that is provided in each of the plurality of calculation devices,
   the first processor determines the job size to be allocated to each of the plurality of second processors based on the obtained characteristic information and the obtained load information,
   the first processor divides the job to be processed into the plurality of divided jobs based on the determined job size, and
   the first processor allocates the plurality of divided jobs to the plurality of processors.

6. The job managing device according to claim 5, wherein the first processor allocates no job to a third processor that processes an input/output processing.

7. The job managing device according to claim 1, wherein the first processor refers to a job script indicating a job operation schedule to generate an estimation of a load transition of each of the plurality of calculation devices, and
   the first processor determines job sizes to be allocated to the plurality of calculation devices based on the generated estimation.

8. The job managing device according to claim 7, wherein the first processor stores a history record of the load transition, and
   the first processor determines job sizes to be allocated to the plurality of calculation devices based on the history record of the load transition.

9. The job managing device according to claim 1, wherein the first processor determines job sizes to be allocated to the plurality of calculation devices so that synchronization timings of the processing of the plural calculation devices are substantially equal to one another.

10. A non-transitory computer-readable recording medium storing a job managing program directing a computer to execute a process to distribute a job to be processed to a plurality of calculation devices, the process comprising:
   obtaining configuration information indicating whether a calculation device is coupled to an input/output device and load information of the plurality of calculation devices;
   determining job sizes to be allocated to each of the plurality of calculation devices based on the obtained configuration information and the obtained load information so as to reduce a reserve capacity of a processing capacity of each of the plurality of calculation devices;
   dividing the job to be processed into a plurality of divided jobs based on the determined job sizes; and
   allocating the plurality of divided jobs to the plurality of calculation devices.

11. A job managing method comprising:
   obtaining configuration information indicating whether a calculation device is coupled to an input/output device and load information of the plurality of calculation devices;
   determining job sizes to be allocated to each of the plurality of calculation devices based on the obtained configuration information and the obtained load information so as to reduce a reserve capacity of a processing capacity of each of the plurality of calculation devices;
   dividing the job to be processed into a plurality of divided jobs based on the determined job sizes; and
   allocating the plurality of divided jobs to the plurality of calculation devices.

* * * * *